United States Patent [19]

Johnston

[11] E Re. 31,096

[45] Reissued Dec. 7, 1982

[54] COUPLING DEVICE

[76] Inventor: James R. Johnston, 6665 Brooklyn Ave., San Diego, Calif. 92114

[21] Appl. No.: 235,024

[22] Filed: Feb. 17, 1981

Related U.S. Patent Documents

Reissue of:

[64] Patent No.: 3,427,691
Issued: Feb. 18, 1969
Appl. No.: 485,736
Filed: Sep. 8, 1965

[51] Int. Cl.[3] ..... A44B 13/00

[52] U.S. Cl. ..... 24/374; 24/238; 24/242

[58] Field of Search ..... 24/238, 239, 241 R, 24/241 SL, 241 PS, 242, 265 H, 373, 374, 375, 376; 63/1 A, 2; 59/93, 95; 294/78 R, 82 R, 83 R; 292/147, 152; 308/140; 403/164, 165, 321

[56] References Cited

U.S. PATENT DOCUMENTS

| | | | |
|---|---|---|---|
| 250,426 | 12/1881 | Coombe | 24/238 |
| 508,910 | 11/1893 | Bickle | 24/238 |
| 1,027,041 | 5/1912 | Gammelgaard | 24/238 |
| 1,130,613 | 3/1915 | Klock | 24/242 |
| 1,240,381 | 9/1917 | Smith | 24/241 SL X |
| 1,246,911 | 11/1917 | Goozey | 24/238 |
| 1,285,597 | 11/1918 | Beck | 24/242 |
| 1,314,803 | 9/1919 | Heller | 24/230 R X |
| 1,365,911 | 1/1921 | Goozey | 24/238 |
| 1,414,041 | 4/1922 | Pennington | 24/242 |
| 1,628,973 | 5/1927 | Harley | 248/328 |
| 1,771,427 | 7/1930 | Waterhouse | 24/238 |
| 2,676,380 | 4/1954 | Lindquist et al. | 24/374 X |
| 2,952,290 | 9/1960 | Gaspardo | 24/242 X |
| 2,986,788 | 6/1961 | Hasek | 24/238 X |
| 3,212,153 | 10/1965 | Lynch | 24/238 |
| 3,225,565 | 12/1965 | Bohlinger et al. | 24/238 X |

FOREIGN PATENT DOCUMENTS

| | | | |
|---|---|---|---|
| 1213282 | 3/1966 | Fed. Rep. of Germany | 403/164 |
| 933755 | 1/1948 | France | 59/95 |

*Primary Examiner*—Thomas J. Holko
*Attorney, Agent, or Firm*—Salter & Michaelson

[57] ABSTRACT

A coupling device having an integral metal member folded over on itself forming two parallel sides which slideably receives another integral metal member folded over on itself, the first member having openings in the top thereof for receiving coupling loops and the second member having complementary openings in the top thereof for the reception and release of coupling loops depending upon its slideable relationship with said first member.

4 Claims, 5 Drawing Figures

FIG. 1
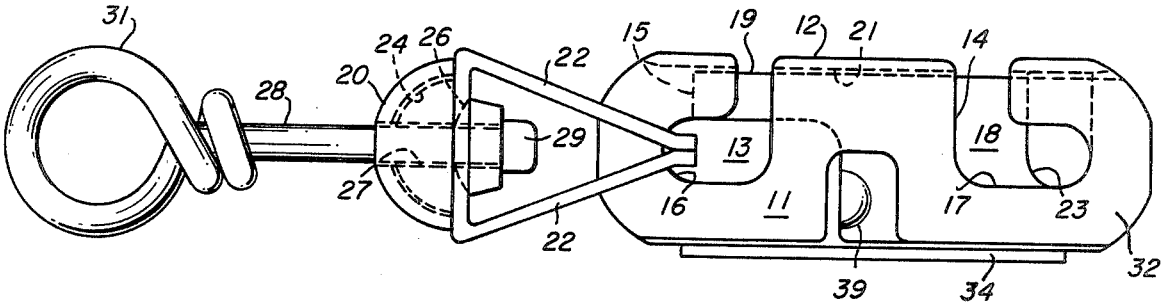
FIG. 2
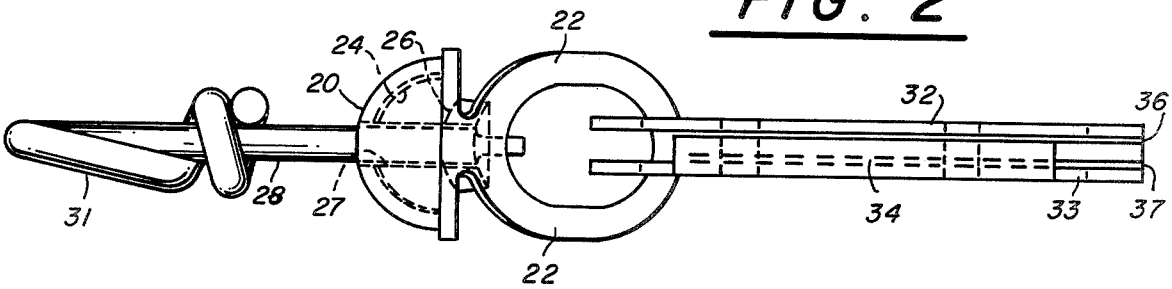
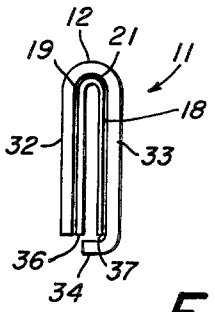
FIG. 3
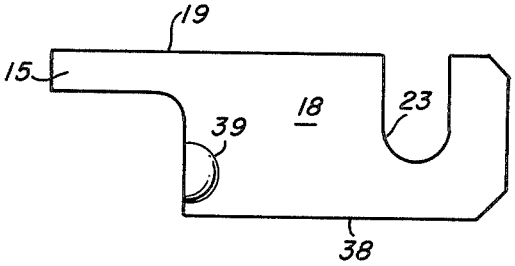
FIG. 4
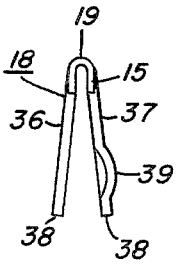
FIG. 5

COUPLING DEVICE

Matter enclosed in heavy brackets [ ] appears in the original patent but forms no part of this reissue specification; matter printed in italics indicates the additions made by reissue.

The present invention relates to a coupling device, and more particularly to a coupling device utilizing a double swivel bearing.

According to the invention, a flat elongated holder member, having first and second parallel sides joined by a bend at one edge thereof, is provided, having a pair of openings in the folded edge for the placement therein of eyes to be coupled together. An inside member, also fabricated by folding metal forming two parallel sides, is adapted to be slideably received by the slot defined by the two parallel sides of the flat elongated member. The inside member has an extension on one end, the end first placed within the slot, which closes the furthermost opening from the end it is entered. This locks in any device to be coupled on that end of the flat elongated holder member, the device being coupled having been placed within the opening before the inner member was received.

The inner member has a cutout portion on the opposite end from the extension for cooperation with the other opening of the flat elongated holder member in effecting a closure of the other opening. This, of course, completes the coupling to a second eye or ring to be coupled to the first eye or ring mentioned above.

In cases where a swivel coupling is desirable, such as coupling fish lines to lures, etc., a double swivel bearing is coupled to the first end mentioned above, leaving the second end open for coupling to the lure. The swivel bearing is constructed of three inter-fitting members having spherical surfaces, the center member being a bearing, such as Teflon or nylon. This effects a double bearing surface to insure ease of rotation.

An object of the present invention is the provision of a coupling device for coupling two eyes or loops together.

Another object of the invention is the provision of a coupling device which is extremely simple to operate.

A further object of the present invention is the provision of a coupling device which is inexpensive to manufacture and simple to assemble.

A further object of the present invention is the provision of a coupling device with a swivel bearing attached thereto.

Yet another object of the present invention is the provision of a swivel having a double bearing surface.

Other objects and many of the attendant advantages of this invention will be readily appreciated as the same becomes better understood by reference to the following detailed description, when considered in connection with the accompanying drawing, in which like referenced numerals designate like parts throughout the figures thereof, and wherein:

FIG. 1 is a side elevation of the preferred embodiment of the present invention;

FIG. 2 is a bottom view of the embodiment of FIG. 1;

FIG. 3 is a view of the holder member and inner member taken from the right end of FIG. 1;

FIG. 4 is a side elevation of the insert of FIG. 1; and

FIG. 5 is a view of the insert taken from the left end of the insert as shown in FIG. 1.

Referring to FIG. 1, flat elongated holder member 11 has folded top edge 12 with cutouts 13 and 14. Cutout 13 has lateral extension cutout 16 and cutout 14 has lateral extension cutout 17. Lateral extension cutout 17 is deeper than lateral cutout section 16. Within flat elongated holder member 11, flat elongated inner member 18 is slideably received. Flat elongated inner member 18 has top folded edge 19 abutting the inner surface 21 of top folded edge 12. Extension 15 of flat elongated inner member 18 blocks vertical cutout 13, retaining eye bracket 22 therein. Flat elongated member 18 also has vertical cutout 23 for cooperation with vertical cutout 14 and lateral cutout 17 of flat elongated holder member 11.

Eye bracket 22 is integral with hemisphere 20 which receives hemisphere 24 which in turn receives retaining spherical-surface member 26. Hemispheres 20 and spherical-surfaced members 24 and 26 each have a central bore 27 for the passage therethrough of pin 28. Pin 28 has a flattened retaining portion 29 and is terminated at the other end in eye 31.

Referring to FIG. 2, a bottom view is shown of FIG. 1 showing parallel walls 32 and 33, parallel wall 33 terminating in a transverse lip 34. Flat elongated inner member 18 also has parallel walls 36 and 37 abutting parallel walls 32 and 33, respectively, of flat elongated holder member 11. Eye bracket 22 again terminates and is integral with hemisphere 20, hemisphere 20 receiving hemisphere 24, and hemisphere 24 receiving spherical-surfaced member 26. Again, bores 27 in members 20, 24 and 26 receive pin 28, flattened portion 29 being at one end of pin 28, and eye 31 at the other end.

Referring to FIG. 3, an end view is shown illustrating a folded edge at 21 of flat elongated holder member 11 and parallel sides 32 and 33. Parallel sides 36 and 37 of flat elongated inner member 18 abut parallel sides 32 and 33, respectively, of flat elongated holder member 11. Inner surface 21 of folded edge 12 abuts folded edge 19 of flat elongated inner member 18. Parallel side 32 of flat elongated holder member 11 terminates in lip 34.

Referring to FIGS. 4 and 5, flat elongated inner member 18 is illustrated. One end of folded flat elongated inner member 18 terminates in extension 15, the other end having vertical cutout 23. Fold 19 defines a top edge of member 18, member 18 terminating in the two bottom edges 38. One-half blister 39 or corner edge of side 37 bent slightly out acts as a stop or lock until squeezed in with a finger to release inner member 18. Flat elongated inner member 18 is constructed of a resilient material such as spring steel, its uncompressed position being shown by FIG. 5. In assembly, the two sides 36 and 37 of flat elongated inner member 18 are squeezed together and pushed between parallel walls 32 and 33 of flat elongated holder member 11 to form a slideable frictioned engagement therewith. Eyes 22 are passed through the cutout 13 and placed within extension cutout 16 prior to assembly, and after inner member 18 is pushed to the position shown in FIG. 1, cutout 13 blocked by extension 15 of inner member 18. At this time, inner member 18 can be pushed further by applying pressure to the left wall of cutout 23, sliding cutout 23 down to coincide with vertical cutout 14 in holder member 11. An eye can then be placed within cutout 14, and cutout 23, and inner member 18 can be pulled into the condition shown by pulling the eye to the right, thereby closing vertical cutout 14 with inner member 18.

Hemispherical socket 20 receives hemispherical socket 24, which is preferably a bearing material such as Teflon or nylon, and retaining spherical-surfaced member 26 is received by bearing hemisphere 24. Hence, there are two bearing surfaces provided, the engagement between hemispheres 20 and 24, and the engagement between hemisphere 24 and spherical-surfaced member 26. Since both of these offer low frictional resistance, the eye 31 will spin or pivot or rotate independent of the eyes 22 of the bracket and the rest of the coupling device, as well as anything coupled in cutouts 17 and 23. Since only one is needed, the other provides a back-up or assurance.

It should be understood, of course, that the foregoing disclosure relates to only a preferred embodiment of the invention, and that it is intended to cover all changes and modifications of the examples of the invention herein chosen for the purposes of the disclosure, which do not constitute departures from the spirit and scope of the invention.

What is claimed is:

1. A coupling device comprising:

a flat elongated *integral metallic* holder member, [said flat elongated holder member having first and second parallel sides joined at one edge thereof,] *consisting of substantially flat metallic material folded on itself along a fold line so as to define first and second parallel sides joined to each other only at the folded edge defined by said fold line,* said first and second sides defining an elongated slot;

at least one opening *extending* through said [one] *folded* edge *adjacent one end* of said [flat elongated] holder member, [adjacent one end thereof;] at least one aperture *extending* through said first and second parallel sides [of said flat elongated holder member adjacent another end thereof;] *adjacent the other end of said holder member;* and a flat elongated *integral* inner *metallic* member consisting of *substantially flat metallic material folded on itself along a fold line so as to define parallel* first and second sides [joined at one edge thereof, said first and second sides being] spring-loaded *outwardly* with respect to each other [from moving apart when held in parallel relationship] *when said inner member is positioned within said holder member, with the spring loaded sides of the former* for effecting a *resilient* frictional engagement with [said flat elongated holder member, said inner member being slidably mounted within said flat elongated holder member, said flat elongated inner member having an extension on one end thereof for opening and closing said one opening] *the inner surfaces of the parallel sides of the latter, said inner member being slidable within the confines of said holder member and having an extension at one end thereof for opening and closing said one opening.*

2. The coupling device of claim 1 wherein said flat elongated inner member further includes a [second extension on said] *portion adjacent the* other end thereof for opening and closing said at least one aperture.

3. The coupling device of claim 1 and further including swivel means attached to said [aperture] *opening* .

4. The coupling device of claim [1] *3* wherein said swivel means comprises:

a hemispherical receptacle coupled to said aperture, the inner bearing surface of said receptacle being directed towards said aperture;

a bearing member having an outer spherical bearing surface and rotatably coupled to said receptacle, said [inner] *outer* bearing surface being directed away from said aperture; and a spacer means rotatably mounted between said hemispherical receptacle and said bearing member and having spherical bearing surfaces contacting said receptacle and said bearing member.

* * * * *